United States Patent [19]

Nöethe et al.

[11] 4,133,915

[45] Jan. 9, 1979

[54] METHOD OF PRODUCING COATED OPTICAL ELEMENTS

[75] Inventors: Bjöern Nöethe, Ebersberg; Helmut Saller, Munich, both of Germany

[73] Assignee: Siemens Aktiengesellschaft, Berlin & Munich, Germany

[21] Appl. No.: 819,378

[22] Filed: Jul. 27, 1977

[30] Foreign Application Priority Data

Jul. 30, 1976 [DE] Fed. Rep. of Germany ..... 26343986

[51] Int. Cl.$^2$ .......................... B05D 1/36; G02B 1/10; G02B 5/14; G02B 5/16
[52] U.S. Cl. ...................................... 427/160; 427/163
[58] Field of Search ............................... 427/163, 160; 350/96.29, 96.32

[56] References Cited

U.S. PATENT DOCUMENTS 3,937,559  2/1976  Ferrentino et al. .................... 350/96

FOREIGN PATENT DOCUMENTS 2528991  12/1976  Fed. Rep. of Germany ............ 350/96

Primary Examiner—James R. Hoffman
Attorney, Agent, or Firm—Hill, Gross, Simpson, Van Santen, Steadman, Chiara & Simpson

[57] ABSTRACT

Optical fibers or bundles of fibers are uniformly coated with a high-boiling, viscous or thixotropic, optically clear liquid, such as polydimethylsiloxane, polymethylphenylsiloxane and then coated with a curable resin, such as urethane.

6 Claims, No Drawings

METHOD OF PRODUCING COATED OPTICAL ELEMENTS

BACKGROUND OF THE INVENTION

The invention relates to optically transmissive elements and somewhat more particularly to a method of producing light-wave guide elements having a protective layer thereon.

Prior Art

Glass fibers or glass fiber bundles are essential components in optical cables which transmit light and communications imparted onto light-waves. During the construction of optical cables, the mechanical properties of such glass fibers and/or fiber bundles must be taken into consideration, i.e., the glass fibers and/or bundles thereof must be protected against mechanical stresses. It has been suggested that glass fibers or fiber bundles can be protected against such stresses by encasement thereof with a protective coating, for example, composed of a synthetic resin. However, such an encapsulating or encasing coating does not always provide an effective protection against mechanical stresses because forces transmitted to such protective coatings are directly transmitted to the fibers and may cause damage. In order to decrease the degree of mechanical coupling between a glass fiber and an associated protective layer, the art has suggested to loosely accommodate a glass fiber or a fiber bundle within a protective coating. However, production of such loosely accommodating light-wave guide coatings is extremely expensive.

A substantial problem in collating glass fibers into fiber bundles is that on the one hand, the individual fibers must be radially held together and on the other hand, the fibers must have free axial mobility relative to one another so that the fibers will not break due to stretching or compression, as may occur during bending or handling of an optical cable. Further, the surface of the individual fibers must be protected against damage by some coating means because even slight fiber surface damage can cause a fiber break, with the resultant loss of light wave guide transmission.

SUMMARY OF THE INVENTION

The invention provides a method of producing coated optical elements whereby a glass fiber, a fiber bundle or a group of bundles are encapsulated within a protective coating at a relatively low expense and the so-coated fibers and/or bundles are able to move relative to one another with very little friction between the individual fibers or fiber bundles. Fibers and/or fiber bundles produced in accordance with the principles of the invention are readily handleable and any danger of the fiber damage or breakage is low so that handling of such protected fibers or bundles can be practically accomplished without any damage.

In accordance with the principles of the invention, glass fibers or fiber bundles are coated or drenched with a high-boiling, i.e., at 0.1 N/mm² (Newtons per square-millimeter) the boiling point is above 180° C., highly viscous or thixotropic, i.e., at 20° C. the viscosity ranges from 1 to 200 Ns/m² (Newtons-seconds per square meter), optically clear, i.e., optically homogeneous so that a one centimeter thick layer has a transparency greater than 70% at a wavelength ranging from 0.4 to 1.5 micrometers, liquid and then encapsulated with a curable resin. In preferred embodiments of the invention, the optically clear, highly viscous liquid is a material selected from the group consisting of polydimethylsiloxane, polymethylphenylsiloxane, hydrocarbon or ester oils and mixtures thereof. In preferred embodiments of the invention, the curable resin is comprised of a mixture of di- or polyisocyanate and di- or polyol, which upon curing, remains flexible. The resin material may be foamed and can be dyed in bulk for application on the fibers or can be marked by printing or the like after curing on the fibers.

DESCRIPTION OF THE PREFERRED EMBODIMENTS

The invention provides a method of producing protectively coated optical fibers and/or optical fiber bundles.

In accordance with the principles of the invention, optical fibers or fiber bundles are coated or drenched with a high-boiling, highly viscous or thixotropic, optically clear liquid and are then encapsuled with a curable resin.

In preferred embodiments of the invention, the optically clear liquid is a material selected from the group consisting of polydimethylsiloxane, polymethylphenylsiloxane, hydrocarbon or ester oils or mixtures thereof. The resin material forming the outer coating of protected optical elements produced in accordance with the principles of the invention may have an open or closed cellular sponge or foam structure and may be dyed in bulk or may be marked as desired after curing.

The invention facilitates the production of flexible, only moderately abrasive-sensitive light-conducting elements (fibers, bundles or a plurality of bundles), whose light-conductivity is only slightly decreased even after a break in an individual fiber. In accordance with the principles of the invention, even individual glass fibers can be protectively encapsulated in a simple manner with a protective coating so that the fiber is loosely coated and the fiber more or less floats within the protective coating.

With the foregoing general discussion in mind, an exemplary embodiment of the invention is presented so as to illustrate to those skilled in the art the manner in which the invention is carried out. However, this exemplary embodiment is not to be construed as limiting the scope of the invention in any way.

A plurality of glass fibers were assembled into a fiber bundle. The fiber bundle was then immersed in a high-boiling, highly viscous or thixotropic, optically clear liquid (immersion liquid) composed of polymethylphenylsiloxane. This immersion liquid adheres to the surface of the individual fibers so that when the fiber bundle was removed from the immersion liquid, a substantially uniformly coated bundle was obtained. The so-coated fiber bundle was then encompassed with a curable urethane resin material, such as obtained by a mixture of a di- or polyisocyanate with a di- or polyol. The resin material was then hardened to form an outer protective layer on the fiber bundle. The so-attained bundle was then extensively handled without any damage or breakage being noted.

In place of the above immersion liquid, other similar immersion liquids may also be utilized, for example, such as polydimethylsiloxane, polymethylphenysliloxane, hydrocarbon or ester oils and/or mixture thereof.

Individual glass fibers may be encapsuled in a protective coating in a manner similar to that described above so that such fibers are longitudinally displaceably positioned within the protective coating and any axial forces impacting against the coating remain below the permissible limit of the fiber.

The resin materials utilized to form the outer coating on glass fibers or fiber bundles in accordance with the principles of the invention are preferably materials which remain soft and/or flexible after curing. Such soft cured resin materials function as an absorption-buffering layer between the light-wave guide fibers and the surrounding environment. If a resin material which is foamed or which can be changed into a foam or is a soft resin is utilized, such resin material is cured or hardened after the application thereof onto fibers or fiber bundles coated with an immersion liquid (with or without a separation medium) by initiating the curing reaction with the substantially simultaneous formation of fine-pore, open or closed cellular sponge or foam structure. An exemplary resin material useful in the practice of the invention is a mixture of di- or polyisocyanate and a di- or polyol, to which a suitable hardening agent may be added, if desired. However, the cured resin must at least remain flexible.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A method of producing optical fibers or fiber bundles coated with a protective layer, comprising:
   substantially uniformly coating glass fibers or fiber bundles with a high-boiling, highly viscous, optically clear liquid, said liquid being characterized by:
   a boiling point above 180° C. at 0.1 Newtons per square millimeter;
   a viscosity in the range from 1 to 200 Newtons-seconds at a temperature of 20° C., and
   a transparency so that a 1 centimeter thick layer of such liquid has a transparency of more than 70% at a light wavelength ranging from 0.4 to 1.5 micrometers, and
   encapsulating the so-coated fibers or fiber bundles with a curable resin material and curing such resin to form an outer coating about the so-coated fibers or fiber bundles.

2. A method as defined in claim 1 wherein the optically clear liquid is a material selected from the group consisting of polydimethylsiloxane, polymethylphenylsiloxane, hydrocarbon or ester oils and mixtures thereof.

3. A method as defined in claim 1 wherein the curable resin is dyed in bulk before encapsulating the coated fibers or fiber bundles.

4. A method as defined in claim 1 wherein the curable resin is marked by printing after curing on the coated fibers or fiber bundles.

5. A method as defined in claim 1 wherein the cured resin is soft after curing.

6. A method as defined in claim 1 wherein the resin material is a foamed structure after curing.

* * * * *